(12) United States Patent
Rooney

(10) Patent No.: US 6,530,404 B1
(45) Date of Patent: Mar. 11, 2003

(54) RUNFLAT ALL TERRAIN TIRE

(75) Inventor: Timothy Michael Rooney, Munroe Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/762,501

(22) PCT Filed: Sep. 2, 1998

(86) PCT No.: PCT/US98/18256

§ 371 (c)(1),
(2), (4) Date: Feb. 7, 2001

(87) PCT Pub. No.: WO00/13923

PCT Pub. Date: Mar. 16, 2000

(51) Int. Cl.[7] .......................... B60C 11/11; B60C 11/13; B60C 101/00; B60C 105/00; B60C 121/00

(52) U.S. Cl. ........................... 152/209.11; 152/209.12; 152/209.19; 152/209.26; 152/517; 152/523; 152/555

(58) Field of Search ..................... 152/209.12, 209.13, 152/209.11, 209.19, 209.26, DIG. 3, 209.15, 517, 555, 523, 209.27

(56) References Cited

U.S. PATENT DOCUMENTS

| | | | |
|---|---|---|---|
| 2,605,807 A | * | 8/1952 | Wittmer |
| 4,067,374 A | * | 1/1978 | Alden et al. |
| 4,345,632 A | * | 8/1982 | Takigawa et al. |
| 4,687,037 A | | 8/1987 | Pfeiffer et al. .......... 152/209 R |
| 5,058,643 A | * | 10/1991 | Nakasaki |
| 5,549,146 A | | 8/1996 | Trabandt et al. ......... 152/154.2 |
| 5,725,701 A | * | 3/1998 | Rooney et al. |
| 5,879,482 A | * | 3/1999 | Rooney et al. |
| 5,988,247 A | * | 11/1999 | Tanaka |
| 6,338,374 B1 | * | 1/2002 | Nguyen et al. |

FOREIGN PATENT DOCUMENTS

| | | |
|---|---|---|
| EP | 0842795 A2 | 5/1998 |
| FR | 2425334 | 12/1979 |
| JP | 63-176705 | * 7/1988 |
| JP | 7-47812 | * 2/1995 |
| WO | 9803356 | 1/1998 |

OTHER PUBLICATIONS

Database WPI Section Ch, Week 9049, Derwent Publications Ltd, London, GB; AN 90–364253 XP002100632 & JP 02 237805 A (Howshaw R J), Sep. 20, 1990.

* cited by examiner

Primary Examiner—Steven D. Maki
(74) Attorney, Agent, or Firm—David L. King

(57) ABSTRACT

An all terrain vehicle tire (10) has an annular tread (12) and a casing (11) radially inward of the tread (12). The tread (12) has a plurality of tread lugs (92, 94) and a central rib (95). The plurality of tread lugs (92, 94) are disposed on each tread half and spaced axially from the equatorial plane of the tire (10). The spacing from the equatorial plane of the tire (10) is a distance of at least 10% of the tread width. The central rib (95) is located between the plurality of tread lugs (92) on each tread half. The central rib (95) has a nonskid depth as measured from the inner tread surface of less than the maximum nonskid depth of the tread lugs (92, 94). The preferred embodiment tire (10) has a pair of inserts (42), one insert (42) being in each sidewall (18, 20) of the tire (10) and a third insert (70) disposed between a breaker reinforcing structure (36) and at least one ply reinforcing structure (38) of the casing (11).

10 Claims, 5 Drawing Sheets

RUNFLAT ALL TERRAIN TIRE

TECHNICAL FIELD

This invention relates to run flat all terrain vehicle tires. As used herein all terrain vehicle tires include tires for such vehicles as small tractors, lawnmowers, ATV, golf carts, skid steer and other light vehicles.

BACKGROUND OF THE INVENTION

The present invention relates to a run flat tire for all terrain vehicles wherein the tire has a unique tread sidewall structure that permits the tire to be run without being inflated. The inventor of the present invention was also a co-inventor of the unique bead construction for A.T.V. tires which prevented the tire from dislodging from the rim, in the event of a flat. In his earlier patent application, Ser. No. 08/616,360, he provided an interesting background of all terrain vehicle tires. These tires are generally wide and relatively tall in comparison to their nominal rim diameters, which generally range from 8 inches to 12 inches. In that patent application Mr. Rooney had indicated the level of technology as it related to run flat A.T.V. type vehicle tires. And more importantly the general state of the art of run flat tires generally. In developing that tire Mr. Rooney discovered that with all terrain vehicles which carry relatively light loads at low inflation pressures, it was possible to build a tire that could be operated in a totally non-pneumatic fashion. In other words the tire could be designed such that no air pressure was needed above atmospheric conditions.

Having discovered this was a practical solution to A.T.V. tire design, Mr. Rooney has further discovered that enhancements to an all terrain vehicle run flat tire having unlimited run flat capability could be achieved by optimization of both the tread design and the underlying tire structure.

The most relevant prior art document U.S. Pat. No. 4,687,037 is a passenger tire having the features recited in the preamble of claim 1 that portion of the claim after the characterizing clause being novel and inventive over that reference. Each dependent claim defines features of the preferred embodiment tire.

SUMMARY OF THE INVENTION

An all terrain vehicle run flat tire (10) is disclosed the tire has an annular tread (12) the tread (12) having a pair of lateral edges (14, 16), the distance half way between the lateral edges (14, 16) defining the equatorial plane of the tire (10). The tread (12) has a plurality of tread lugs (92, 94) in a central rib (95). The plurality of tread lugs (92, 94) are disposed on each tread half and are spaced axially from the equatorial plane, a distance of at least 5% of the tread width. The central rib (95) is located between and separates the plurality of tread lugs (92) on each tread half. The central rib (95) has a height as measured from the inner tread surface of the tire of less than the maximum height of the tread lugs. The tire has a casing radially inward of this tread. In the preferred embodiment, the height of the central rib (95) is less than half the height of the tread lugs. Preferably the central rib (95) has a plurality of narrow grooves or sipes (95) extending across the rib, (95) the narrow grooves being of a depth less that 75% of the height of the central rib.

The tread lugs (92, 94) have a radially outer surface; the radially outer surface defining the net contact area when measured on a flat hard surface. The net contact area is located substantially equally on each tread half and is spaced from the central plane or equatorial plane a distance of at least 5% of the tread width. The tread lugs (92) has a net surface area representing at least 50% of the net contact area of the total tread lugs (92,94). Each tread lug (92) may have at least one narrow groove (91, 93) transversely extending or crossing the enlarged inner portion of the tread lug (92). The narrow groove has a depth of less than 75% of the tread lug height.

The all terrain vehicle run flat tire of the present invention has a casing which has a cord reinforced breaker structure radially inward of the tread, at least one ply reinforcing structure radially inward of the breaker reinforcing structure and extending radially inwardly to a pair of substantially inextensible bead cores, a pair of run flat inserts, one run flat insert being radially inward of the ply reinforcing structure and extending from radially under the breaker structure and one bead core. In the preferred embodiment the casing further has a third run flat insert located between the breaker reinforcing structure and at least one ply reinforcing structure. The third insert (70) extends laterally overlapping the pair of run flat inserts (42). The third insert (70) underlying the tread structure provides improved uninflated handling characteristics greatly stiffening the area between the lateral edges (14,16) of the tread (12) and in combination with the other sidewall inserts (42) provide superb run flat capability.

DEFINITIONS

Figure 1:
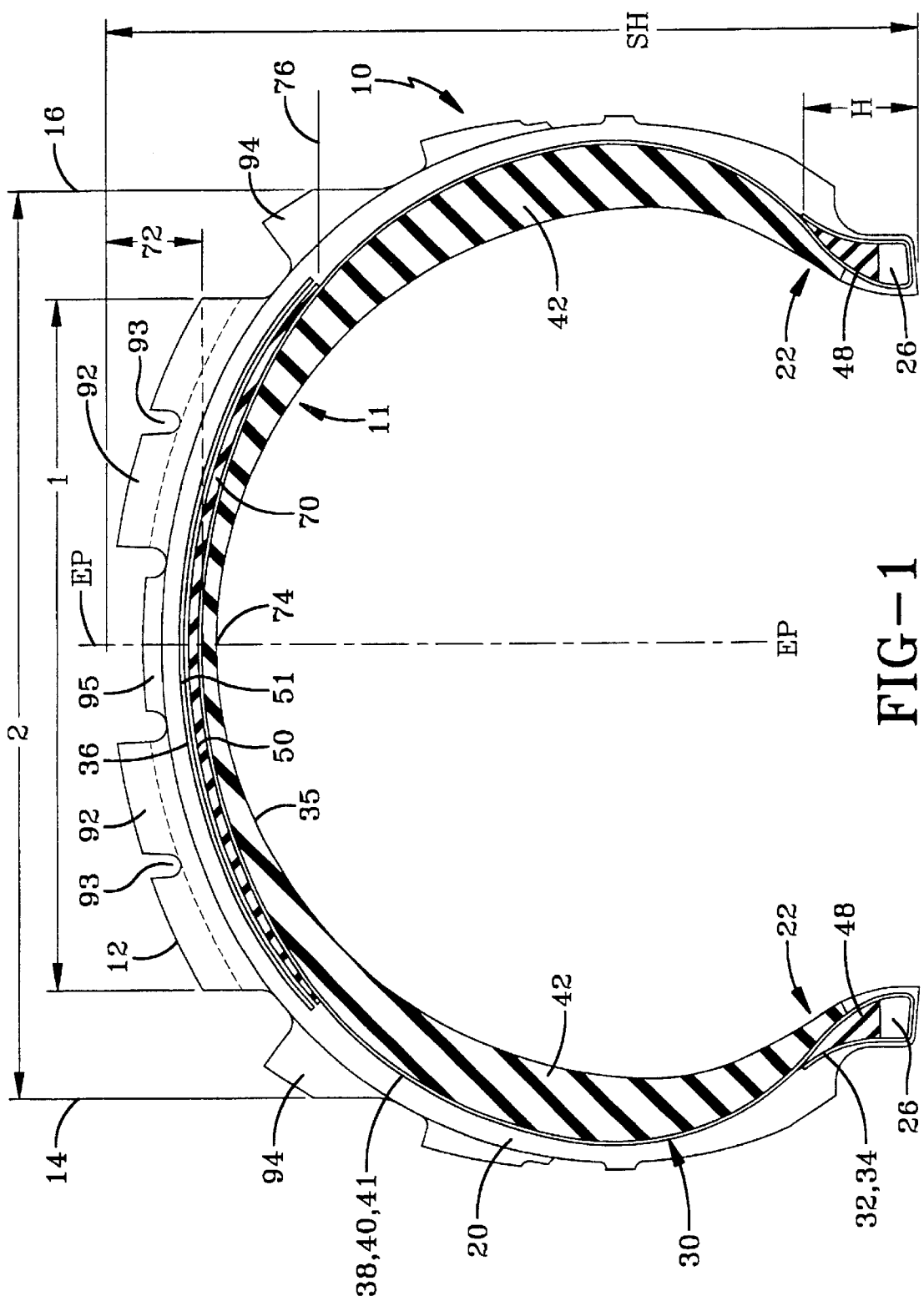
FIG. 1 is a cross sectional view of the run flat tire made in accordance of one embodiment of the present invention.

"Aspect Ratio" means the ratio of this section height to its section width.

"Axial" and "axially" means the lines or directions that are parallel to the axis of rotation of the tire.

"Bead or Bead Core" means generally that part of the tire comprising an annular tensile member, the radially inner beads are associated with holding the tire to the rim being wrapped by ply cords and shaped with or without other reinforcement elements such as flippers, chippers, apexes or fillers, toe guards and chafers.

"Belt or Breaker Structure" means at least two annular layers or plies of parallel cords, woven or unwoven, underlying the tread, unanchored to the bead, and having both left and right cord angles in the range from 17° to 27° with respect to the equatorial plane of the tire for radial ply tires and within 3° of the angle of the bias ply cords in a bias tire.

"Bias Ply Tire" means that the reinforcing cords in the carcass ply extend diagonally across the tire from bead-to-bead at about a 25–65° angle with respect to the equatorial plane of the tire, the ply cords running at opposite angles in alternate layers.

"Carcass" means a laminate of tire ply material and other tire components cut to length suitable for splicing, or already spliced, into a cylindrical or toroidal shape. Additional components may be added to the carcass prior to its being vulcanized to create the molded tire.

"Casing" means the carcass, belt structure, beads, sidewalls, and all other components of the tire excepting the tread and under tread. The casing may be new, unvulcanized rubber or previously vulcanized rubber to be fitted with a new tread.

"Chafer" refers to narrow strips of material placed around the outside of the bead to protect cord plies from the rim, distribute flexing above the rim, and to seal the tire.

"Circumferential" means lines or directions extending along the perimeter of the surface of the annular tread perpendicular to the axial direction.

"Deflection" means the reduction in section height of a loaded tire at a given inflation pressure.

"Equatorial Plane (EP)" means the plane perpendicular to the tire's axis of rotation and passing through the center of its tread.

"Footprint" means the contact patch or area of contact of the tire tread with a flat surface at zero speed and under normal load and pressure.

"Groove" means an elongated void area in a tread that may extend circumferentially or laterally about the tread in a straight, curved, or zigzag manner. Circumferentially and laterally extending grooves sometimes have common portions. The "groove width" is equal to the tread surface area occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are of substantially reduced depth as compared to wide circumferential grooves which they interconnect, they are regarded as forming "tie bars" tending to maintain a rib-like character in the tread region involved.

"Inner liner" means the layer or layers of elastomer or other material that form the inside surface of a tubeless tire and that contain the inflating fluid within the tire.

"Lateral" means an axial direction.

"Normal Inflation Pressure" means the specific design inflation pressure and load assigned by the appropriate standards organization for the service condition for the tire.

"Normal Load" means the specific design inflation pressure and load assigned by the appropriate standards organization for the service condition for the tire.

"Ply" means a continuous layer of rubber-coated parallel cords.

"Radial" and "radially" mean directions radially toward or away from the axis of rotation of the tire.

"Radial Ply Tire" means a pneumatic tire in which the ply cords which extend from bead to bead at cord angles between 65° and 90° with respect to the equatorial plane of the tire.

"Section Height" means he radial distance from the normal rim diameter the outer diameter of the tire at its equatorial plane.

"Section Width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Shoulder" means the upper portion of sidewall just below the tread edge, tread shoulder or shoulder rib means that portion of the tread near the shoulder.

"Sidewall" means that portion of a tire between the read and the bead.

"Spring Rate" means the stiffness of the tire as the slope of the load-deflection curve at a given pressure.

"Tread" means that portion of the tire that comes into contact with the road under normal inflation and load.

"Tread Width" means the arc length of the tread surface in the axial direction, that is, in a plane parallel to the axis of rotation of the tire.

DETAILED DESCRIPTION OF THE INVENTION

The invention shown in FIG. 1 disclosed herein relates to a run flat tire (10) particularly suited for all terrain vehicles "A.T.V." to include but not limited to off-road recreational, utility, golf cart, riding lawn mower and skid steer type vehicles. The term "run flat" as used in this patent means that the tire structure alone is sufficiently strong to support the vehicle load when the tire is operated in uninflated condition, the sidewall and internal surfaces of the tire do not collapse or buckle on to themselves and do not require any internal device to prevent the tire from collapsing. Conventional pneumatical all terrain vehicles tire when operated without inflation collapse when supporting the vehicle load.

The reference numerals are depicted the drawings are the same as referred to in the specification. For purposes of this application the various embodiments illustrated in FIGS. 1–5 each use the same reference numerals for similar components. The tire (10) according to the present invention as illustrated in FIGS. 1–5 is an all terrain run flat tire. The tire (10) is provided with a ground engaging tread portion (12) which terminates into shoulder portions at the lateral edges (14, 16) of the tread (12). Sidewall portions (18, 20) extend from the tread lateral edges (14, 16) respectively and terminate into a pair of bead regions (22) each having an annular inextensible bead core (26) respectively. The tire (10) is further provided with a casing (11) having a carcass reinforcing structure (30) which extends from bead region (22) through the sidewall portion (18), tread portion (12), sidewall portion (20) to bead region (22). The carcass reinforcing (30) preferably has at least one reinforcing ply structure (38), the reinforcing ply structure 38 preferably has turn-up ends (32) wrapped about the bead cores (26) respectively. The tire (10) may include a conventional innerliner (35) from the inner peripheral surface of the tire (10), however, since the tire (10) is capable of operating in a totally uninflated condition the innerliner component (35) need not be used. One pair of tread reinforcing belt or breaker structures (36) are preferably placed circumferentially about the radially outer surface of the carcass reinforcing structure (30), beneath the tread portion (12). In the particular embodiment illustrated the breaker structure (36) each comprised two layers (50, 51) and the cords of the breaker (50, 51) are oriented at an angle of about 63°. with respect for the mid-circumferential center plane of the tire (10).

The cords of the breaker ply (50) are disposed in an opposite direction of the mid-circumferential plane and from that the cords of the breaker ply (51). However, the belt or breaker structures (36) if used in the A.T.V. tire may comprise any number of belt or breaker plies of any desired configuration and the cords may be disposed at any-desired angle. Belt or breaker structures (36) provide lateral stiffness across the belt width so to help minimize lifting of the tread (12) from the road surface during operation of the tire in the uninflated state as well as providing puncture resistance. In the embodiment illustrated this can be accomplished by making the cords of belt or breaker plies (50, 51) of nylon or similar synthetic material.

It must be appreciated that the employment of a belt or breaker structure can have detrimental effects on ride and handling and, therefore, many applications the use of such features may be undesirable for a particular A.T.V. vehicle. Furthermore these belts or breaker structures may be desirable in the front tires or the rear tires but not in both the front and the rear tires. One of ordinary skill in the tire building art can easily appreciate when such components should be employed and when they should be avoided.

In some applications and particularly when radial ply reinforcing structures are used it is recommended that the belt structures can use non-synthetic metal or steel cord.

Figure 2:
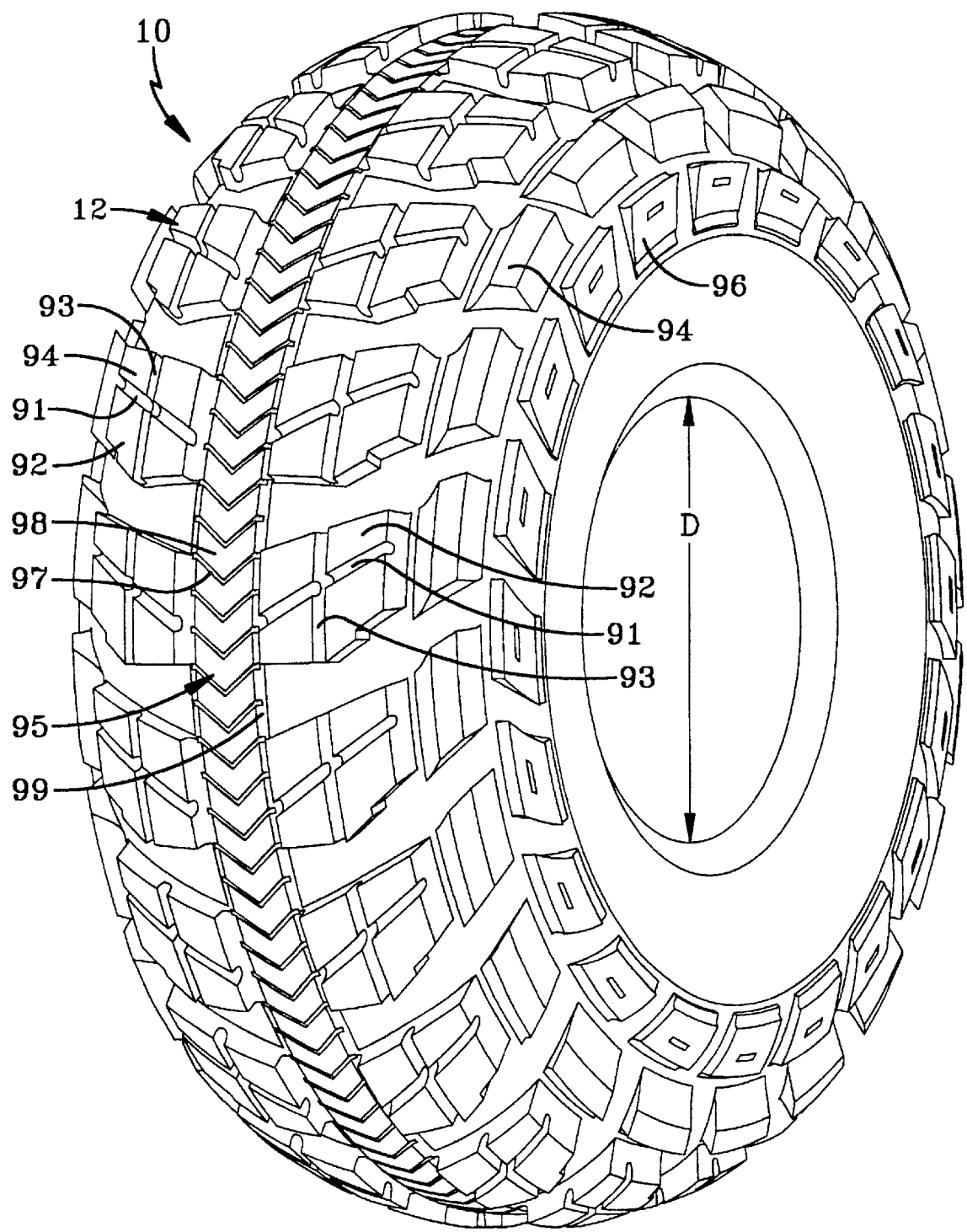
FIG. 2 is a perspective view of the tire according to the present invention.
Figure 3:
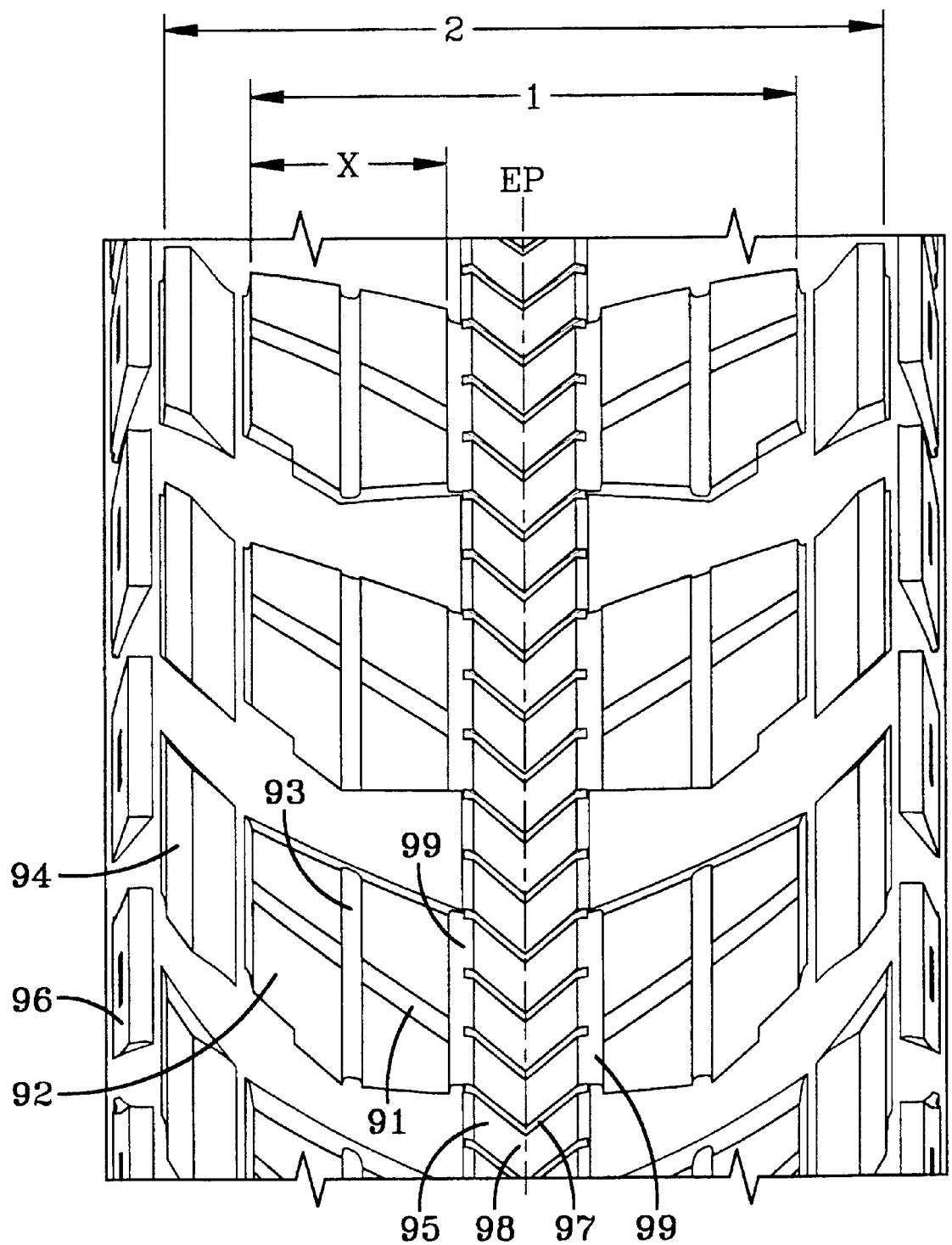
FIG. 3 is an enlarged fragmentary plan view of the tread of the tire according to the preferred embodiment of the present invention.

The tire (10) illustrated in FIGS. 1–3 show the carcass reinforcing structure (30) which has at least one reinforcing ply structure (38). The reinforcing ply structure (38) has at least one ply layer of cords (41) for a radial ply tire, the cords (41) are oriented in the angle range of 65–90° relative to the equatorial plane and the structure (38) for a bias tire has at least 2 ply layers (38,40) of cords (41), the cords of each adjacent layer being equal but oppositely oriented at an angle of 25° to 65° with respect to the equatorial plane of the tire. As further illustrated in FIG. 1 the reinforcing ply structure (38) has turn-up ends (32), which wrap around the bead cord (26). The turn up ends terminate radially above the:bead core (26). The turn-up ends of the ply (38) terminates radially a distance above the nominal rim diameter of the tire in proximity to the radial location of the maximum width of the section of the tire (10). In the preferred embodiment, the turn-up ends (32) are located within 30% of the section high SH of the tire from the radial location of the maximum section width, most preferably terminating at a location half-way between the radial location H of the maximum section width and the nominal rim diameter D.

With reference to FIG. 1 showing the cross-section of the A.T.V. run flat tire has interposed between the breaker structure (36) and the plies (38, 40) a tread run flat insert (70). The tread run flat insert (70) provides a lateral stiffness across the tread interface when the tire is operated without air pressure. The thickness of the tread insert (70) preferably is a maximum at the equatorial plane or center plane of the tire and thins out as the insert (70) extends laterally towards the sidewalls (18, 20) of the tire (10). The tread insert (70) is radially outward of the sidewall insert (42). Interestingly, if one measures the thickness of the tire (10) when the tread thickness is approximately ⅓ above the under tread, this distance represents the tire in a fully worn condition where the tread has been worn sufficiently to need replacement. This worn condition is shown in the phantom line. If one measures the total thickness of the sidewall as it extends from the bead region (22) upward through the shoulder region of the tire, one finds that the sidewall is substantially uniform in thickness. As one extends through the carcass structure (30) to the center plane of the tire, one will note that the use of the tread insert (70) in combination with the tread (12) itself in the fully worn condition achieves a similar thickness to that of the sidewall. In other words, the tire as measured radially outwardly from a tire inner surface to the ⅓ non-skid height of the tread lugs at the center plane of the tire has a thickness approximately equal to the thickness of the sidewall as measured at the maximum section width of the tire. This interestingly creates a very uniform tire having reasonable stiffness around the entire peripheral surface of the carcass (30). For example, if one measures the thickness of the sidewall at the maximum section width of the tire (10), one finds that the sidewall thickness is approximately 17 mm (0.66 inches), when measuring the tire to it's ⅓ non-skid height as measured from the center plane of the tire, one finds that the thickness is 17 mm (0.64 inches). This uniformity in both the tread and sidewall structure thickness enhances the tire's ability to perform in the uninflated condition.

As can further be shown in the cross sectional view of the tire (10), at the centerline of the tire (10) the tread (12) as measured to location (72) has a shoulder drop off of approximately 25 mm (1 inch). At the center line of the tire (10) as measured at location (74), the tread (12) and carcass structure (30) has a radial and inward dimension of 25 mm (0.990 inches) or approximately the same as the drop off of the exterior surface of the tread (12). The tire (10) when normally loaded has a deflection that approximates 150% of the drop off or approximately 38 mm (1.5 inches) as shown in the FIG. 4. These deflections and dimensions as discussed are very important to the performance of the tire (10) in the run flat condition and in particular have been developed with a specific tread (12) in mind to enhance the run flat capability of the tire without sacrificing the off-road performance of the vehicle.

As further shown in FIG. 1, the sidewall portions (18, 20) are provided with elastomeric fillers (42) commonly referred to as inserts or run flat inserts. These fillers (42) may be employed between the innerliner (35) and the first reinforcement ply (38). The fillers (42) extend from each bead region (22) radially to beneath the reinforcing of breaker structure (36) and the tread insert (70).

Located within the bead region (22) and radially inner portion of the sidewall portions (18, 20) are high modulus elastic fillers (48) commonly referred to as apex inserts which are disposed between carcass reinforcing structure (30) and the turn-up ends (32, 34). These elastomeric fillers (48) extend from the radially outer portion of the bead cores (26) respectively up into the sidewall portion gradually decreasing in cross-sectional width. Preferably the elastomeric inserts (48) terminate at a radially outer end at a distance at least above where the nominal flange diameter of the rim is located. These sidewall fillers (42, 48) provide in combination with the plies (38, 40) sufficient sidewall supporting strength to carry the load without allowing the sidewalls (18, 20) to buckle upon themselves.

Figure 5:
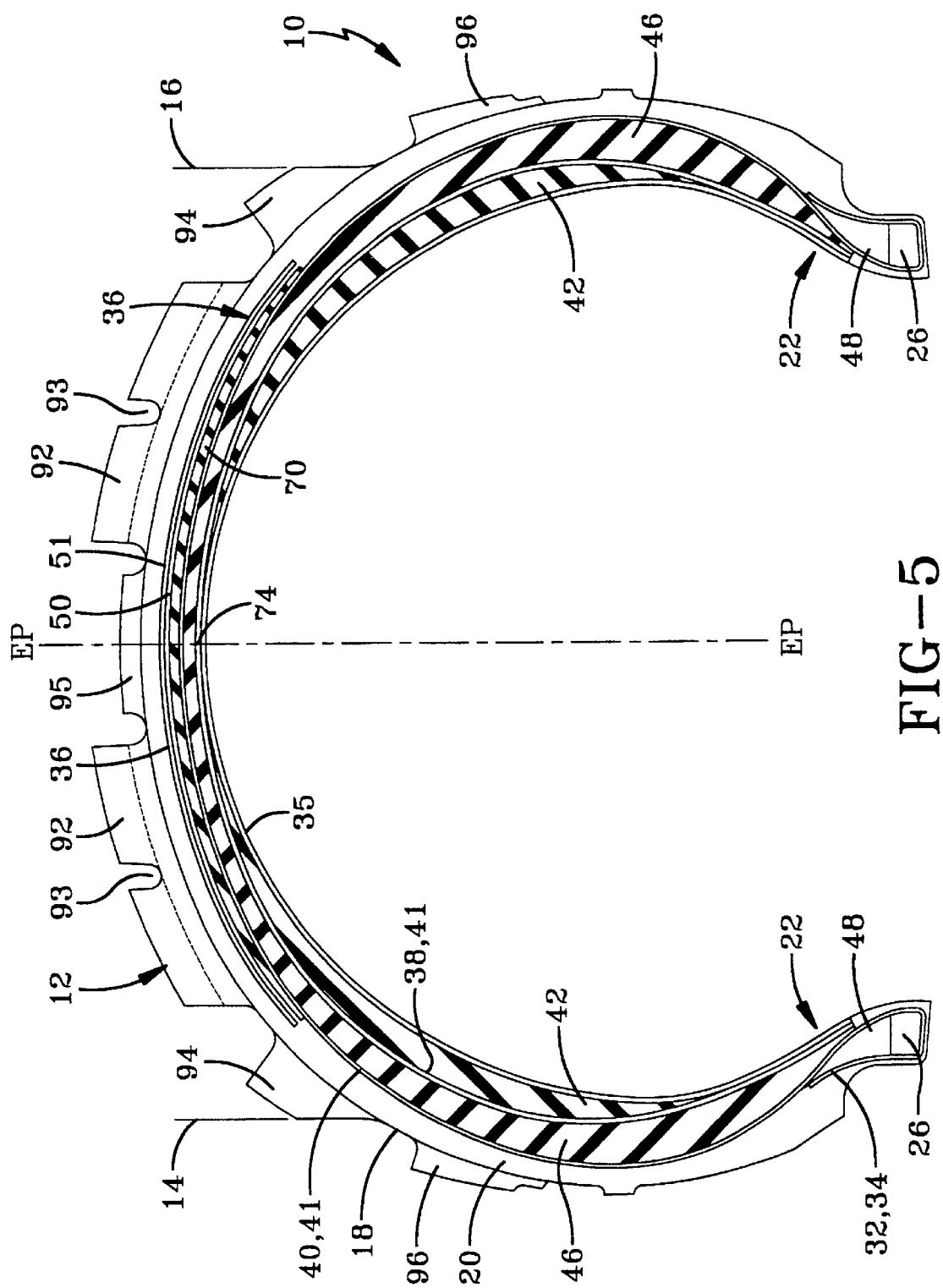
FIG. 5 is a cross-sectional view of an alternative embodiment tire (10) that has two run flat inserts per sidewall (18) (20).

In alternative embodiment tire (10), as illustrated in FIG. 5, a second elastomeric filler (46) may be employed. The second elastomeric filler (46) should be spaced between two plies if used. This enhances the load carrying capacity of the carcass structure (30) and provides for greater run flat capability. As previously discussed the total sidewall thickness is approximately 16.6 mm (0.65 inches) around the entire peripheral surface of the tire (10). This thin sidewall construction is made possible by the employment of the unique tread design (12). The tread (12) is shown in FIG. 3 in plan view has a unique tread pattern that enhances run flat capability. The tread pattern is unlike any A.T.V. tire known today. It is important to note that A.T.V. tires have a net contact area that generally exhibits between 15 and 25% of the total tread area. In other words 85%–75% of the tread area is a void area. This very low net area allows the tread to be fairly open and non-clogging when used in muddy conditions. While such treads are very open, they have to have sufficient lug biting edges to grip the ground and provide forward driving traction. The tread (12) is divided into three primary regions. The total tread area which is approximately 90% or more of the maximum section width, extends around the shoulder and includes sidewall lugs (96). These sidewall lugs (96) are primarily used in hard cornering maneuvers.

Laterally inward of each of the sidewall lugs (96) are two rows of shoulder lugs (94). The shoulder lugs (94) respectively lie over the lateral edges (14 and 16) and preferably a majority of the surface of these lugs lie axially inward of each respective lateral edge (14, 16). This area between the two opposing rows of shoulder lugs (94) on each tread half represents the primary working area (2) of the tread (12) in a normal driving condition. In the tire (10) as shown this working area (2) represents 200 mm (7.9 inches) of a total tread area of (288 mm (11.36 inches). As shown this working area (2) occupies a lateral width of the tread, if placed on a hard flat surface that represents the normal fully loaded static deflection of the tire in terms of its lateral width or about 70% of the total tread width.

A central area or portion (1) of the tire (10), which is included in the primary working area (2) of the tire is shown inward of the shoulder lugs (94) and adjacent to the lugs (92) on each side of the central plane of the tire (10). These enlarged lugs (92) are preferably separated by narrow shallow depth grooves (91, 93). These shallow grooves (91, 93) enable the enlarged lug (92) to have a limited amount of flexibility when the tire is new and as the tread (12) wears these grooves (91, 93) become shallower as the tire lug (92) becomes more flexible due to a reduction in the tread rubber mass. The central working area (1) lies between the axially outer extreme of the lugs (92) and represents the normally loaded deflection condition of the tire (10). Unlike the fully loaded static deflection condition (which includes the driver and all racks being loaded to the maximum weight of the vehicle), this central working area (1) reflects a tire condition with a driver and a vehicle with racks unloaded. As shown, the lugs (92) have an axially width X of approximately 51 mm (2 inches). If one measures across each circumferential band formed by the axial width X of the lugs (92), the net contact area, as illustrated, is 47.1% of the tread area as measured circumferentially around the tire. It is believed that for the tread (12) to work properly in an uninflated condition this contact area should be relatively high in the 40–60% range. Lying between the two rows of lugs (92) on each half of the tread (12) is a shallow centrally disposed rib (95) comprising of plurality of chevron shaped elements (98). The central rib (95) is divided by shallow chevron shaped narrow grooves (97). The chevron shaped grooves (97) provided circumferential flexibility of the rib (95). It is believed preferable that the grooves (97) be extremely shallow. The rib (95) has a radial height approximately equal to one-third of the total tread depth of the tire. Adjoining each of the lugs (92) and the rib (95) are tie bars (99), the tie bars (99) preferably have a contour surface established by a full radius.

The central working area (1) of the tread (12) is measured between the axially outermost lateral extremes of the lugs (92) as shown has an approximate tread width of 140 mm (5.5 inches) approximately 50% of the total tread width. The central rib (95) occupies a space of approximately 38 mm (1.5 inches) between the two adjacent lugs (92) on each side of the tread (12). The overall net-to-gross ratio in the central working area (1) of the tread (12) is preferably greater than 30%, in the preferred tire approximately 34% as measured between the lateral extremes of the lugs (92) lying on each side of the tread. This area (1) represents about 50% of the total tread width Interestingly, the net-to-gross ratio as measured between the lateral extremes of the two shoulder lugs (94) is preferably greater than 30% or approximately 33% and represents about 70% of the total tread width. While 33% is a relatively high net-to-gross ratio for a conventional A.T.V. tire, it must be appreciated that the density of the tread elements (92, 94) lying on each side of the central plane in the primary working area (2) of the tread (12) between the two rows of lugs (94), the fully loaded and normal loaded condition, yields a high lug density for enhanced treadwear while at the same time provides a very open pattern within the central area (1) and in the area between the tread lugs (92) and lugs (94). This high density net-to-gross ratio of the tread elements is unique in A.T.V. tires; however, it is very complementary to a tire that is run in an uninflated condition.

Figure 4:
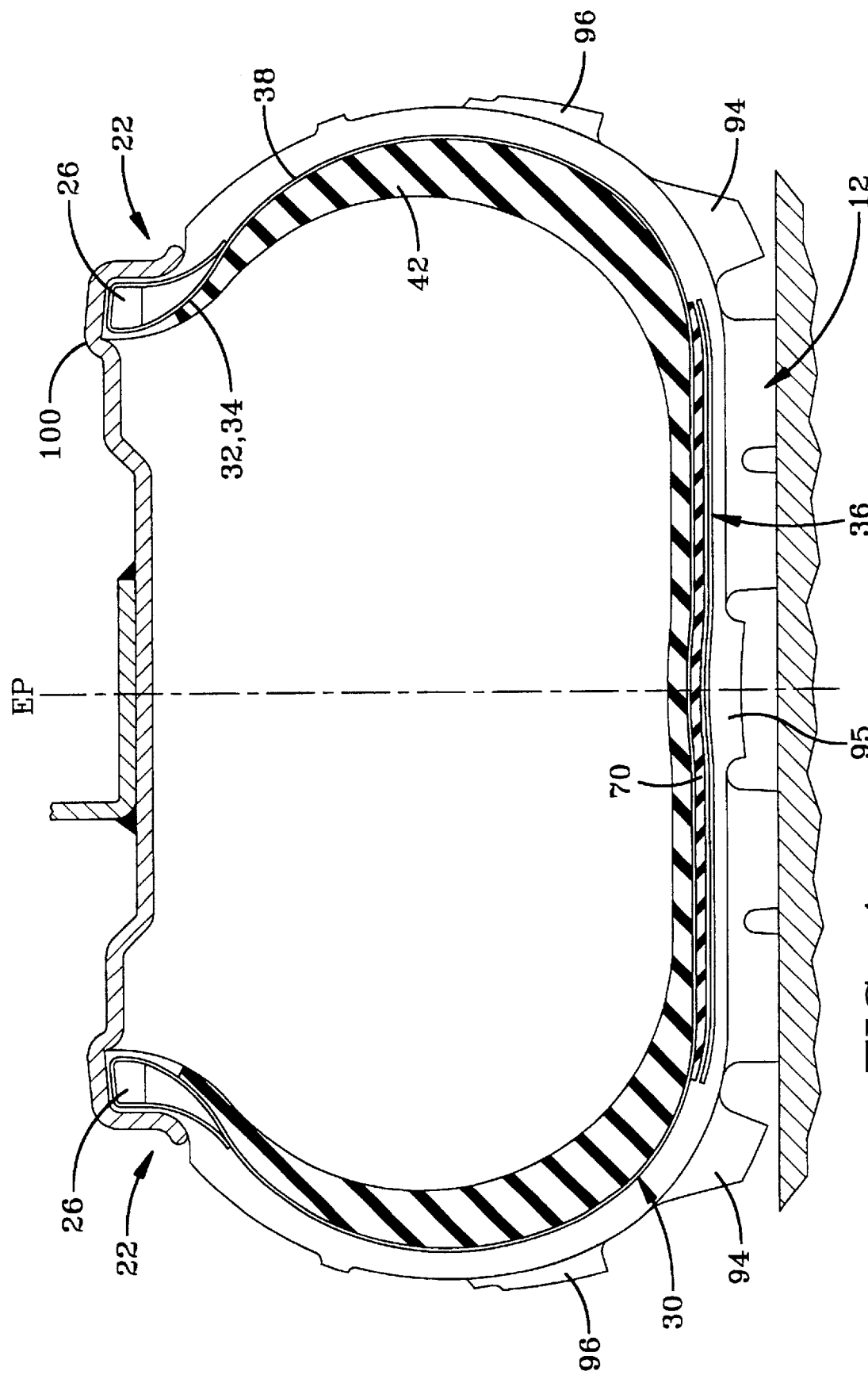
FIG. 4 is a partial cross-sectional view of the tire shown in a loaded but uninflated condition.

As shown in FIG. 4, the tread (12) when operated under the normal load or the normally fully loaded condition exhibits a phenomenon known as oil canning. Oil canning is where the lateral extremes along the entire shoulder regions of the tread remain in contact with the ground while the central region of the tread (12) tends to deflect and is pulled away from normal ground contact. Because the tread (12) of the present invention has basically a void area in the central region, this oil canning phenomenon as it relates to tread contact area is of minimal consequence. The underlying tread in combination with the tread insert (70) and the breaker (36) and ply structures (38) minimize the amount of oil canning to an acceptable level while the tread region on each side of the central rib (95) of the tread has high density lugs (92, 94) having a large net contact area for carrying the load. The lugs (92) in combination with the shoulder lugs (94) provide the tread element support needed to provide forward traction under all driving conditions. It is this unique tread pattern in combination with the underlying run flat carcass structure (30) that enables the tire to be operated in a fully non-pneumatic fashion. The tread (12) has been configured to minimize irregular wear due to operation without air. This greatly simplifies the driver's task with regard to tires. Due to the relatively light weight of the vehicle contemplated for use with this design in combination with the fact that the components have been specifically designed for run flat performance, the tire (10) of the present invention is capable of operating continuously in an uninflated condition for the normal life of the tire.

Should the operator desire to provide increased load carrying capacity beyond what normally recommended it is possible to inflate the tire (10) to provide some additional support if needed.

In the preferred embodiment it is shown applicants have chosen to use a bead core (26) which has a very wide flat base preferably the bead core (26) is of a rectangular or substantially square cross-sectional configuration as shown. The bead (26) has an inside diameter as measured from the flat base (27) which is substantially equal to the bead hump diameter of the rim. This bead core (26) enables the tire to be operated without air without dislodging from the rim diameter. This preferred bead core has been described in an earlier patent application, U.S. patent Ser. No. 08/616,360.

Run flat performance of the tire (10) may be further enhanced by providing the ply coat of each layer of the reinforcing ply structures (38,40) with an elastomeric material having substantially the same physical properties as that of the elastomeric fillers (42,46, 48, 70). As is well known to those skilled in the tire art, the ply coat of a fabric layer is the layer of unvulcanized elastomeric material which is applied to fabric prior to its being cut to its desired shape and applied to the tire on the tire building drum. Preferably, the elastomeric material used as a ply coat for the ply layers (38) is similar to the elastomeric material used in the fillers (42,46, 48, 70).

In practice, the rubber compositions for the first fillers (42), second fillers (46), if used, and the ply coats for one or more ply structures (38, 40) utilized in this invention for the aforesaid pneumatic tire construction are preferably characterized by physical properties which enhance their utilization in the invention which are, collectively, believed to be a departure from properties of rubber compositions normally used in pneumatic tire sidewalls, particularly the combination of first and second fillers (42, 46) with plies (38 and/or 40) having similar high stiffness/low hysteresis properties as hereinafter described.

Preferably, while the discussion herein refers to the ply coat(s) being for one or more of ply structures (38, 40), in the practice of this invention, the plycoats referenced herein refers to plycoats for both plies (38, 40) unless only one of such plies is used.

In particular, for the purposes of this invention, both of the aforesaid fillers (42, 46) are characterized by having a high degree of stiffness yet by also having a relatively low hysteresis for such a degree of stiffness.

The stiffness of the rubber composition for fillers (42, 46) is desirable for stiffness and dimensional stability of the tire sidewall.

The stiffness of the rubber composition for the ply coat for one or more of plies (38, 40) is desirable for overall dimensional stability of the tire carcass, including its sidewalls, since it extends through both sidewalls and across the crown portion of the tire.

As a result, it is considered that the stiffness properties of the aforesaid rubber compositions of the first and second fillers (42, 46) and of the ply structures (38 and/or 40) cooperate with the plies (38 and/or 40) to reinforce each other and to enhance the aforesaid dimensional stability of the tire sidewalls to a greater degree than if either of the aforesaid fillers or plycoats were alone provided with a high stiffness rubber composition.

However, it is to be appreciated that rubbers with a high degree of stiffness in pneumatic tires normally be expected to generate excessive internal heat during service conditions (operating as tires on a vehicle running under load and/or without internal inflation pressure), particularly when the rubber's stiffness is achieved by a rather conventional method of simply increasing its carbon black content. Such internal heat generation within the rubber composition typically results in a temperature increase of the stiff rubber and associated tire structures which can potentially be detrimental to the useful life of the tire.

The hysteresis of the rubber composition is a measure of its tendency to generate internal heat under service conditions. Relatively speaking, a rubber with a lower hysteresis property generates less internal heat under service conditions than an otherwise comparable rubber composition with a substantially higher hysteresis. Thus, in one aspect, a relatively low hysteresis is desired for the rubber composition for the fillers (42, 46) and the plycoat(s) for one or more of the plies (38, 40).

Hysteresis is a term for heat energy expended in a material (e.g.: cured rubber composition) by applied work and low hysteresis of a rubber composition is indicated by a relatively high rebound, a relatively low internal friction and relatively low loss modulus property values.

Accordingly, it is important that the rubber compositions for the fillers (42 46) and plycoats for one or more of plies (38, 40) have the properties of both relatively high stiffness and low hysteresis.

The following selected desirable properties of the rubber compositions for the fillers (42, 46) as well as for the plycoats for one or more of the plies (38, 40) are summarized in the following Table 1.

TABLE 1

| Properties | Filler | Ply Coat |
| --- | --- | --- |
| Hardness (Shore A)[2] | 60–85 | 60–70 |
| Modulus (100%) MPa[3] | 5–7 | 4–6 |
| Static Compression[1] | 0.1–0.15 | 0.15–0.2 |
| Heat Buildup (° C.)[1] | <30 | <30 |
| Cold Rebound (about 23° C.)[4] | 55–70 | 55–70 |
| E' at 100° C. (MPa) | 10–15 | 10–15 |
| E" at 100° C. (MPa) | 0.5–1.5 | 1–1.5 |

[1]Goodrich Flexometer Test-ASTM Test No. D623
[2]Shore Hardness Test-ASTM Test No. D2240
[3]Tension Modulus Test-ASTM Test No. D412
[4]Zwick Rebound Test-DIN 53512

The indicated hardness property is considered to be a moderate rubber hardness.

The indicated modulus property at 100% modulus is utilized instead of a 300% modulus because the cured rubber has a relatively low ultimate elongation at its breaking point. Such a cured rubber is considered very stiff.

The indicated static compression property, measured on a flexometer, is another indication of the relatively high stiffness of the cured rubber.

The indicated E' property is a coefficient of the storage or elastic module component of the viscoelastic property which is an indication of the material (e.g.: cured rubber composition) stiffness.

The indicated E" property is a coefficient of the loss or viscous module component of the viscoelastic property which is an indication of the hysteretic nature of the material (e.g.: cured rubber composition).

The utilization of both the E' and E" properties to characterize stiffness and hysteresis of rubber compositions is well known to those having skill in such characterizations of rubber.

The indicated heat buildup value is measured by a Goodrich flexometer (ASTM D623) test and is indicative of the internal heat generation of the material (e.g.: cured rubber composition).

The indicated cold rebound test property at about 23° C. (room temperature) is measured by Zwick Rebound Test (DIN 53512) test and is indicative of the material's (e.g.: cured rubber composition) resilience.

Thus, the properties illustrated in Table 1 indicate a cured rubber composition with a relatively high stiffness, moderate hardness and a relatively low hysteresis for a rubber with such a high stiffness.

The low hysteresis is demonstrated by the relatively low heat buildup, low E" and high rebound properties and is considered necessary for a rubber composition desired to have a relatively low internal heat buildup in service.

In the compounding of the various tire components, various rubbers may be used which are, preferably, relatively high unsaturation diene-based rubbers. Representative examples of such rubbers are, although they may not be so limited, are: styrene-butadiene rubber, natural rubber, cis 1,4 and 3,4-polyisoprene rubbers, cis 1,4 and vinyl 1,2-polybutadiene rubbers, acrylonitrile-butadiene rubber, styrene-isoprene-butadiene rubber and styrene-isoprene rubber.

Various of the preferred rubbers for the rubber compositions for the fillers (42, 46) and for the plycoat(s) for one or more of the plies (38, 40) are natural cis 1,4-polyisoprene rubber, isoprene/butadiene rubber, and cis 1,4-polybutadiene rubber.

Preferred combinations, or blends, of rubbers are natural cis 1,4-polyisoprene rubber and cis 1,4-polybutadiene rubber for the fillers and natural cis 1,4-polybutadiene rubber and isoprene/butadiene copolymer rubber for the plycoat(s).

In a preferred practice, based on 100 parts by weight rubber, (A) the fillers are comprised of about 60 to 100, preferably about 60 to 90, parts natural rubber and, correspondingly, up to about 40, preferably about 40 to about 10, parts of at least one of cis 1,4 polybutadiene rubber and isoprene/butadiene rubber preferably cis 1,4-polybutadiene rubber, where said isoprene/butadiene rubber, if used, is present in a maximum of 20 parts, and (B) the said plycoat(s) are comprised of up to 100, preferably about 80 to about 100 and more preferably about 80 to about 95, parts natural rubber and, correspondingly, up to about 100, preferably up to about 20 and more preferably about 20 to about 5, parts of at least one of isoprene/butadiene copolymer rubber and cis 1,4 polybutadiene rubber, preferably an isoprene/butadiene rubber; wherein the ratio of isoprene to butadiene in said isoprene/butadiene copolymer rubber is in a range of about 40/60 to about 60/40.

It is further contemplated, and is considered to be within the intent and scope of this invention that a small amount, such as about 5 to about 15 parts, of one or more organic solution polymerization prepared rubbers may be included with the aforesaid natural rubber, and cis 1,4 polybutadiene rubber and/or isoprene/butadiene rubber composition(s) for the said fillers and/or plycoat(s), of which the option and selection of such additional rubber(s) can be made by.one having skill in the rubber compounding art without undue experimentation.

Thus, in such circumstance, the description of the filler and plycoat rubbers Is set forth in a "comprising" manner with the intent that small amounts of such solution polymerization prepared elastomers can be added so long as the aforesaid physical property parameters of the cured rubber compositions are met. It is considered that such rubber compounding is within the skill of those with experience in the rubber compounding art without undue experimentation.

While not necessarily limited thereto, such other contemplated solution prepared rubbers are styrene/butadiene, and polymers of one or more of isoprene and butadiene such as 3,4-polyisoprene, styrene/isoprene/butadiene terpolymers and medium vinyl polybutadiene.

It should readily be understood by one having skill in the art that rubber compositions for components of the pneumatic tire, including the first and second fillers (42, 46) as well as ply coat(s) for one or more or plies (38, 40), can be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as rubber processing oils, resins including tackifying resins, silicas, and plasticizers, fillers, pigments, stearic acid or other materials such as tall oil resins, zinc oxide, waxes, antioxidants and antiozonants, peptizing agents and reinforcing materials such as, for example, carbon black. As known to those skilled in the art, depending on the intended use of the sulfur vulcanizable and sulfur vulcanized materials (rubbers), the certain additives mentioned above are selected and commonly used in conventional amounts.

Typical additions of carbon black comprise about 30 to about 100 parts by weight, of diene rubber (phr), although about 40 to about a maximum of about 70 phr of carbon black is desirable for the high stiffness rubbers desired-for the indicated fillers and plycoat(s) used in this invention. Typical amounts of resins, if used, including tackifier resins and stiffness resins, if used, including unreactive phenol formaldehyde tackifying resins and, also stiffener resins of reactive phenol formaldehyde resins and resorcinol or resorcinol and hexamethylene tetramine may collectively comprise about 1 to 10 phr, with a minimum tackifier resin, if used, being 1 phr and a minimum stiffener resin, if used, being 3 phr. Such resins may sometimes be referred to as phenol formaldehyde type resins. Typical amounts of processing aids comprise about 4 to about 10.0 phr. Typical amounts of silica, if used, comprise about 5 to about 50, although 5 to about 15 phr is desirable and amounts of silica coupling agent, if used, comprise about 0.05 to about 0.25 parts per-part of silica, by weight. Representative silicas may be, for example, hydrated amorphous silicas. A representative coupling agent may be, for example, a bifunctional sulfur containing organo silane such as, for example, bis-(3-triethoxy-silylpropyl) tetrasulfide, bis-(3-trimethoxy-silylpropyl) tetrasulfide and bis-(3-trimethoxy-silylpropyl) tetrasulfide grafted silica from DeGussa, AG. Typical amounts.of antioxidants comprise 1 to about 5 phr. Representative antioxidants may be, for example, diphenyl-p-phenylenediamine and others, such as those disclosed in *The Vanderbilt Rubber Handbook* (1978), pages 344–346. Suitable antiozonant(s), and waxes, particularly microcrystalline waxes, may be of the type shown in The *Vanderbilt Rubber Handbook* (1978), pages 346–347. Typical amounts of antiozonants comprise 1 to about 5 phr. Typical amounts of stearic acid and/or tall oil fatty acid may comprise about 1 to about 3 phr. Typical amounts of zinc oxide comprise about 2 up to about 8 or 10 phr. Typical amounts of waxes comprise 1 to about 5 phr. Typical amounts of peptizers comprise 0.1 to about 1 phr. The presence and relative amounts of the above additives are not an aspect of the present invention which is primarily directed to the utilization of specified blends of resins in tire treads as sulfur vulcanizable compositions.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 8 phr with arrange of from 3 to about 5 being preferred for the stiff rubbers desired for use in this invention.

Accelerators are used to control the time and/or temperature required for vulcanization and to improve the properties of the vulcanizate. In one embodiment, a single accelerator system may be used, i.e., primary accelerator. Conventionally, a primary accelerator is used in amounts ranging from about 0.5 to about 3 phr. In another embodiment, combinations of two or more accelerators in which a primary accelerator is generally used in the larger amount (0.5 to about 2 phr), and a secondary accelerator which is generally used in smaller amounts (0.05–0.50 phr) in order to activate and to improve the properties of the vulcanizate. Combinations of such accelerators have historically been known to produce a synergistic effect of the final properties of sulfur cured rubbers and are often somewhat better than those produced by use of either accelerator alone. In addition, delayed action accelerators may be used which are less affected by normal processing temperatures but produce satisfactory cures at ordinary vulcanization temperatures. Representative examples of accelerators include amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound, although a second sulfenamide accelerator may be used. In the practice of this invention, one and sometimes two, or more accelerators are preferred for the high stiffness rubbers.

The tire can be built, shaped, molded and cured by various methods which will be readily apparent to those having skill in the art.

EXAMPLE 1

The following rubber compositions are provided which are intended to exemplary of rubber compositions with properties which can fall within those exemplified in Table 1.

Rubber compositions are prepared and mixed by conventional rubber mixing processes and comprised of the materials shown in Table 2 which represent rubber compositions which may be contemplated for use as fillers (42, 46) and ply coat(s) for one or more of plies (38, 40). The indicated amounts of materials have been rounded for the illustration of this Example.

TABLE 2

| | (Parts by Weight) | |
|---|---|---|
| Material | Plycoat | Filler |
| Natural Rubber[1] | 90 | 80 |
| Isoprene/Butadiene Rubber[2] | 10 | 0 |
| Polybutadiene (cis 1,4-) Rubber[3] | 0 | 20 |
| Carbon black | 55 | 55 |
| Silica & Coupler | 6 | 6 |
| Zinc Oxide | 5 | 8 |
| Accelerators (Sulfenamide type) | 4 | 2 |
| Sulfur (insol w/20% oil) | 2 | 4 |

Conventional amounts of rubber processing oil and tall oil fatty acid, collectively about 5 parts with a minimum of 1 part each; antidegradants; tackifying and stiffening resins, primarily of the phenolformaldehyde type in an amount of about 6 phr; and silica and coupling agent, therefore, are used with two accelerators for the plycoat sample and one accelerator for the filler rubber composition sample.
1. Cis 1,4-polyisoprene type;
2. Copolymer with ratio of isoprene to butadiene of about 1:1;
3. A high cis 1,4 polybutadiene rubber;

The rubber compositions are molded and cured at about 150° C. for about 20 minutes.

In the practice of this invention, it is considered important that the rubber compositions for both the fillers (42, 46) and the ply coat(s) for one or more of plies (38, 40) are relatively very stiff, moderately hard, and have a low hysteresis.

Further, it is normally desired that the rubber, composition for fillers (42, 46), relative to the rubber composition for plycoats for plies (38 and/or 40) is slightly stiffer, slightly harder and that both of the rubber compositions have a relatively low hysteresis.

It is important to appreciate that the indicated physical properties of the rubber compositions in Table 1 are for samples thereof and that the dimensions, including thickness, of the resulting tire components (fillers and plies) need be taken into account as factors contributing to the overall stiffness and dimensional stability of the tire sidewall and carcass.

It is considered important that the stiffness of the rubber composition for fillers (42, 46) is somewhat greater than that of the aforesaid ply coat rubber composition because they are not a part of a fabric reinforced ply and further, because it is desired to somewhat maximize their stiffness property. The hysteresis, or E", and heat buildup values for the rubber composition for the aforesaid fillers is desirably somewhat lower than that for the rubber composition for the aforesaid ply coat(s) because of the bulk of the fillers versus the thin dimensions of the fabric reinforced plies.

Chafing of the tire in the lower bead region radially outward of the carcass structure (30) adjacent the rim flange although not required in the preferred embodiment tires (10), may be minimized, especially during use of the tire in the uninflated condition, by providing hard rubber chafer portion.

What is claimed is:

1. An all terrain vehicle run flat tire, the run flat tire having a casing and an annular tread which terminates into shoulder portions at the lateral edges of the tread, sidewalls comprising sidewall portions extending from the tread lateral edges and terminating into a pair of bead regions, each bead region having an annular inextensible bead core, a distance halfway between the lateral edges defining the equatorial plane of the tire, the tread having a plurality of tread lugs and a central rib; wherein the plurality of lugs are disposed on each tread half and spaced axially from the equatorial plane a distance of at least 5% of the tread width; the central rib is located between and separates the plurality of tread lugs on each tread half, the central rib having a non-skid height, as measured from an inner tread surface, of less than the maximum non-skid height of tread lugs; the casing has a cord reinforced breaker structure radially inward of the tread and a carcass reinforcing structure having at least one ply reinforcing structure radially inward of the breaker reinforcing structure and extending radially inwardly to the pair of substantially inextensible bead cores, a pair of run flat sidewall inserts, each run flat sidewall insert being radially inward of the ply reinforcing structure and extending from radially under the breaker structure toward one bead core, the run flat tire having a maximum section width and being characterized by the sidewalls having a uniform thickness and a third run flat insert located between the breaker reinforcing structure and the at least one ply reinforcing structure, and extending laterally overlapping the pair of run flat sidewall inserts, wherein the central rib has a radial height equal to ⅓ of the non-skid height of the tread lugs, the tire as measured radially outwardly from a tire inner surface to the ⅓ non-skid height of the tread lugs at the centerplane of the tire has a thickness approximately equal to the thickness of the sidewall as measured at the maximum section width of the tire.

2. The all terrain vehicle run flat tire of claim 1 wherein the central rib has a plurality of narrow grooves extending across the rib, the narrow grooves being of a depth of less than 75% of the non-skid height of the central rib.

3. The all terrain vehicle run flat tire of claim 1 wherein the tread lugs have a radially outer surface, the radially outer surface defines a net contact area when measured on a flat hard surface, the net contact area being located substantially equally on each tread half and spaced from the equatorial plane a distance of at least 5% of the tread width.

4. The all terrain vehicle run flat tire of claim 1 wherein the plurality of tread lugs on each tread half adjacent the central rib have a net contact area representing at least 50% of the total net contact area of the tread lugs.

5. The all terrain vehicle run flat tire of claim 4 wherein an axially inner portion of each lug has an axial width X of about 51 mm (2 inches).

6. The all terrain vehicle run flat tire of claim 5 wherein a circumferential band formed by the axial width of the lugs has a net contact area in the range of 40% to 60%.

7. The all terrain vehicle run flat tire of claim 6, wherein a central working area of the tread as measured between the axially outermost extremes of the lugs on each tread half, is about 50% of the tread width and has a net contact area of greater than 30%.

8. The all terrain vehicle run flat tire of claim 6 further characterized by a plurality of shoulder lugs being divided into two rows, the majority of the lugs lie within the lateral edges and the axial distance between the lateral edges being about 70% of the tread width and having a net-to-gross ratio of greater than 30%.

9. The all terrain vehicle run flat tire of claim 1 wherein each enlarged inner portion of a tread lug has at least one narrow groove transversely extending, the narrow groove having a depth of less than 75% of the tread lug non-skid height.

10. The all terrain vehicle run flat tire of claim 1 wherein the tread has a fully loaded width of 70% of the total tread width and normal loaded tread width of 50% of the total tread width and the net-to-gross ratios of the fully loaded width and the normal loaded width is greater than 30%.

* * * * *